United States Patent
Rosenberger

(10) Patent No.: US 9,254,832 B2
(45) Date of Patent: Feb. 9, 2016

(54) METHOD FOR REDUCING MECHANICAL STRESS ON AT LEAST ONE COMPONENT OF THE DRIVE TRAIN OF A MOTOR VEHICLE, AND CORRESPONDING MOTOR VEHICLE

(75) Inventor: Martin Rosenberger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/346,576

(22) PCT Filed: Aug. 4, 2012

(86) PCT No.: PCT/EP2012/003344
§ 371 (c)(1),
(2), (4) Date: Mar. 21, 2014

(87) PCT Pub. No.: WO2013/041167
PCT Pub. Date: Mar. 28, 2013

(65) Prior Publication Data
US 2015/0073634 A1 Mar. 12, 2015

(30) Foreign Application Priority Data
Sep. 23, 2011 (DE) .......................... 10 2011 114 303

(51) Int. Cl.
*B60W 30/184* (2012.01)
*B60W 10/08* (2006.01)
(Continued)

(52) U.S. Cl.
CPC ................ *B60W 10/08* (2013.01); *B60L 3/106* (2013.01); *B60L 3/108* (2013.01); *B60L 7/10* (2013.01); *B60L 7/26* (2013.01); *B60L 15/20* (2013.01);
(Continued)

(58) Field of Classification Search
None
See application file for complete search history.

(56) References Cited

U.S. PATENT DOCUMENTS

| 4,223,565 A | * | 9/1980 | Sugiyama | B60K 17/24 464/180 |
| 5,994,859 A | * | 11/1999 | Deng | B60L 3/00 318/254.2 |

(Continued)

FOREIGN PATENT DOCUMENTS

| DE | 101 45 891 | 6/2003 |
| DE | 102005033354 | 3/2006 |

(Continued)

OTHER PUBLICATIONS

Copy of International Search Report issued by the European Patent Office in International Application PCT/EP2012/003344 on Apr. 16, 2013.

(Continued)

*Primary Examiner* — Thomas Tarcza
*Assistant Examiner* — Richard Goldman
(74) *Attorney, Agent, or Firm* — Henry M. Feiereisen LLC

(57) ABSTRACT

In a method for reducing a mechanical stress of a component of a drive train of a motor vehicle with at least two wheels, of which at least one wheel is a drive wheel, wherein the motor vehicle has an anti-lock braking system and an electric machine which is coupled to the drive wheel, wherein each wheel of the motor vehicle has a dedicated friction brake, the anti-lock braking system operates individually on each friction brake. During activation of the anti-lock braking system, mechanical stress of an articulated shaft connecting the electric machine and the coupled drive wheel is determined, and the electric machine coupled to the drive wheel is controlled so as to counteract the mechanical stress. A motor vehicle making use of the method si also disclosed.

11 Claims, 2 Drawing Sheets

(51) Int. Cl.
*B60L 7/26* (2006.01)
*B60W 30/18* (2012.01)
*B60T 8/32* (2006.01)
*B60T 8/175* (2006.01)
*B60L 3/10* (2006.01)
*B60L 7/10* (2006.01)
*B60L 15/20* (2006.01)
*B60T 17/22* (2006.01)
*B60W 10/184* (2012.01)
*B60W 30/02* (2012.01)

(52) U.S. Cl.
CPC ............ *B60L 15/2009* (2013.01); *B60T 8/175* (2013.01); *B60T 8/32* (2013.01); *B60T 17/22* (2013.01); *B60W 10/184* (2013.01); *B60W 30/02* (2013.01); *B60W 30/1846* (2013.01); *B60W 30/18109* (2013.01); *B60L 2270/145* (2013.01); *B60T 2201/09* (2013.01); *B60T 2270/604* (2013.01); *B60W 2710/083* (2013.01); *Y02T 10/7275* (2013.01)

(56) References Cited

U.S. PATENT DOCUMENTS

| | | | | |
|---|---|---|---|---|
| 8,195,352 | B2* | 6/2012 | Morris | B60K 6/445 180/65.1 |
| 8,412,395 | B2* | 4/2013 | Sano | B60L 3/0084 701/22 |
| 2002/0180266 | A1 | 12/2002 | Hara et al. | |
| 2003/0062859 | A1 | 4/2003 | Amann et al. | |
| 2003/0180266 | A1* | 9/2003 | McKay | A61K 48/005 424/93.21 |
| 2004/0224821 | A1* | 11/2004 | Hausner | B60T 8/00 477/182 |
| 2005/0155813 | A1* | 7/2005 | Roll | B62D 6/10 180/446 |
| 2005/0182532 | A1* | 8/2005 | Tobler | B60K 6/48 701/22 |
| 2005/0189192 | A1* | 9/2005 | Serebrennikov | B60W 30/20 192/30 V |
| 2006/0025905 | A1* | 2/2006 | Zhao | B60K 6/445 701/22 |
| 2007/0203632 | A1* | 8/2007 | Saitou | B60W 30/20 701/51 |
| 2008/0229836 | A1* | 9/2008 | Melz | G01M 17/007 73/669 |
| 2009/0305832 | A1* | 12/2009 | Matsubara | B60K 6/445 475/150 |
| 2010/0087996 | A1* | 4/2010 | Haggerty | B60K 6/445 701/58 |
| 2012/0035820 | A1* | 2/2012 | Falkenstein | B60K 6/46 701/69 |
| 2015/0027798 | A1* | 1/2015 | Nagamori | B60L 15/2081 180/243 |
| 2015/0073634 | A1* | 3/2015 | Rosenberger | B60L 7/26 701/22 |

FOREIGN PATENT DOCUMENTS

| | | |
|---|---|---|
| DE | 102009000044 | 7/2010 |
| DE | 102009002440 | 10/2010 |
| DE | 102 23 990 | 3/2011 |
| FR | 2 854 357 | 11/2004 |

OTHER PUBLICATIONS

"Forschungsbericht 2008-Fakultät Ingenieurwissenschaften and Informatik" by Fachhoschule Osnabrück (University of Applied Sciences), 2008, p. 22.

Rosenberger at al.; "Hybrid-ABS: Integration der elektrischen Antriebsmotoren in die ABS-Regelung" Conference on Motor Vehicle Techniques, München, 2011.

* cited by examiner

METHOD FOR REDUCING MECHANICAL STRESS ON AT LEAST ONE COMPONENT OF THE DRIVE TRAIN OF A MOTOR VEHICLE, AND CORRESPONDING MOTOR VEHICLE

CROSS-REFERENCES TO RELATED APPLICATIONS

This application is the U.S. National Stage of International Application No. PCT/EP2012/003344, filed Aug. 4, 2012, which designated the United States and has been published as International Publication No. WO 2013/041167 and which claims the priority of German Patent Application, Serial No. 10 2011 114 303.7, filed Sep. 23, 2011, pursuant to 35 U.S.C. 119(a)-(d).

BACKGROUND OF THE INVENTION

The present invention relates to a method for reducing mechanical stress on at least one component of the drive train of a motor vehicle having at least two wheels, of which at least one wheel is a drive wheel, wherein the motor vehicle has an anti-lock braking system and at least one electric machine which for driving precisely one drive wheel the motor vehicle is coupled to this drive wheel, and wherein a respective friction brake is associated at least two wheels of the motor vehicle. The present invention further relates to a motor vehicle with at least two wheels, of which at least one is a drive wheel, including a first friction brake associated with the first wheel and a second friction brake associated with the second wheel, and an anti-lock braking system which is configured to act individually on the friction brakes for each of the wheels of the motor vehicle.

Conventional friction brakes are commonly used as an actuator for an anti-lock braking system (ABS). Here, the ABS is able to generate, in addition to the braking torque requirements for the friction brake, also a torque request for the drive unit, for example the internal combustion engine. This interface to the drive unit is often referenced with the term engine braking control (CEB). The CEB is designed to selectively reduce the drag torque of the drive unit, which acts on the vehicle as an additional braking torque. In some situations, the ABS may even request from the drive unit a driving torque during a braking operation in order to, for example, quickly reduce the brake slip of the tire. The CEB may, of course, only affect the axles connected to the drive unit, i.e. the driven axles. In addition, the CEB may only affect all the wheels connected to the drive unit simultaneously. The effectiveness of the CEB is strongly dependent on the dynamics and control accuracy of the drive unit. In internal combustion engines, both the dynamics and the control accuracy are severely limited by the properties of thermodynamic processes.

For vehicles with electric drive on one or more axles, the ABS usually a similar or identical structure as for conventionally driven vehicles, i.e. vehicles propelled by an internal combustion engine. With electrical drive machines, an actuator is available to the CEB, which is significantly superior to the internal combustion engine with respect to dynamics and control accuracy.

In this context, DE 10 2005 033 354 A1 should be mentioned which, however, applies only to vehicles with a drive topology wherein an electric machine operates on two wheels. This requires a differential between the two drive wheels. The control method proposed in this document is based on the average of the two wheel rotation speeds. This document addresses in particular the damping of the vibrations in the part of the drive train located between the differential and the one electric machine.

DE 102 23 990 B4 discloses a method which relates to the allocation of the total braking torque to a regenerative brake and a friction brake. In particular, a method is described herein addresses the special situation of an imminent or active ABS control to be carried out exclusively with the friction brake. For this special situation, methods are described how an upcoming ABS control can be detected and how the torque of the regenerative brake can be reduced, wherein at the same time the torque of the friction brake is increased accordingly so as to eliminate unwanted changes in the vehicle deceleration.

Significantly more damage was clearly detected in the drive train of conventional motor vehicles where an electric machine is provided for driving exactly one drive wheel and is correspondingly coupled to this drive wheel, than in motor vehicles using a conventional internal combustion engine. The damaged components therefore must be designed with greater dimensions, resulting in an undesirable increase in cost.

SUMMARY OF THE INVENTION

It is therefore the object of the present invention to further develop an aforementioned method and an aforementioned motor vehicle so that the risk of damage to components of the drive train can be reduced.

This object is attained by a method for reducing a mechanical stress of at least one component of a drive train of a motor vehicle having at least two wheels, of which at least one wheel is a drive wheel, and an anti-lock braking system and at least one electric machine which is coupled to the at least one drive wheel for driving exactly one drive wheel of the motor vehicle, and a dedicated friction brake for each wheel of the motor vehicle, wherein the anti-lock braking system operates individually on each friction brake, wherein the method includes, during an activation of the anti-lock braking system, determining a mechanical stress of at least one articulated shaft connecting the at least one electric machine and the coupled drive wheel, and controlling the at least one electric machine coupled to the drive wheel so as to counteract the mechanical stress. The object is also attained by a motor vehicle having at least two wheels, of which at least one wheel is a drive wheel, a first friction brake associated with a first wheel; a second friction brake associated with the second wheel; an anti-lock braking system configured to act individually on the friction brakes of each wheel of the motor vehicle; at least one electric machine, each electric machine coupled to exactly one drive wheel of the motor vehicle for driving the coupled drive wheel; at least one determination device configured to determine, during actuation of the anti-lock braking system, a mechanical stress of at least one articulated shaft connecting the at least one electric machine and the coupled drive wheel; and a control device coupled with the determination device, wherein the control device is configured to control the at least one electric machine coupled to the drive wheel so as to counteract the mechanical stress.

The present invention is initially based on the recognition that the electric machines of electric drives are frequently arranged proximate to the wheels. This results in a significantly altered topology of the drive train in comparison to combustion engine drives. A very high moment of inertia is produced on the output shaft located directly on the drive wheel or proximate to the wheels, in particular in systems where an electric machine drives exactly one drive wheel.

With ABS control or with full braking without ABS control, these moments of inertia can cause extreme stress on the mechanical drive train, especially on an articulated shaft connecting an electric machine and an associated drive wheel as well as an optional additional gear stage. This mechanical stress can cause damage, especially premature wear. Moreover, the aforementioned moments of inertia in conjunction with an elastic articulated shaft can excite vibrations on the articulated shaft due to the dynamic ABS interventions on the friction brake. These vibrations can also lead to premature wear of the drive shafts as well as of an optional additional gear stage.

According to the invention, it is therefore proposed to determine in a step b1) the mechanical stress of at least one articulated shaft connecting an electric machine and an associated drive wheel. The electric machine associated with the drive wheel is then controlled in a step b2) so as to counteract the mechanical stress.

In this way, the mechanical stresses on the articulated shaft and on an optional additional gear stage can be reliably reduced. This allows smaller dimensions, resulting in a cost savings. Moreover, the risk of premature wear is reduced.

However, the present invention results in further significant benefits. The elasticity of the articulated shaft produces, as mentioned above, an oscillatory system. The natural frequency of this system can be in a range that is perceived by the occupants as uncomfortable and annoying. With the approach of the invention, such vibrations can be reduced, in particular minimized, thereby significantly enhancing the comfort for the occupants of the motor vehicle. Moreover, it has been found that, on the one hand, the moments of inertia result in lower dynamics of the wheel, which can affect the ABS control. Similarly, the aforementioned vibrations of an elastically constructed articulated shaft can additionally impair the ABS control. These impairments undesirably lengthen the braking distance. The braking distance can therefore be significantly reduced with the inventive measures, thereby increasing the safety for the occupants of the motor vehicle.

Basically, the present invention can also be applied in motor vehicles with only two wheels, one of which is a drive wheel, such as motorcycles. Particularly advantageously, however, the present invention can be used in a motor vehicle, in particular a passenger car or a truck, which has at least a first and a second drive wheel and at least a first and a second electric machine, wherein the first electric machine is associated with the first drive wheel and the second electric machine is associated with the second drive wheel. In this case, in step b1), a first mechanical stress of at least one articulated shaft associated with the first electric machine and the first drive wheel is determined. Furthermore, a second mechanical stress associated with the second electric machine and the second drive wheel is determined in step b1). Subsequently, in step b2), the electric machine associated with the first drive wheel is controlled such that the first mechanical stress is counteracted, and the electric machine associated with the associated with the second drive wheel is controlled such that the second mechanical stress is counteracted. The drive wheels may, for example, be the two front wheels or the two rear wheels of a passenger car. It will be understood that the present invention can advantageously also be used in vehicles with four-wheel drive.

Preferably, in step b1), the mechanical stress of at least one articulated shaft connecting an electric machine and an associated drive wheel is sensed or calculated. For sensing, sensors that are already present in conjunction with the anti-lock braking system can be used. In particular, such an implementation does not require additional hardware in the vehicle.

Only appropriate interfaces between the anti-lock braking system and the control device for controlling the at least one electric machine need to be provided. However, additional sensors may also be provided, for example strain gauges and the like, which are adapted to detect twisting, torsions and/or vibrations. Alternatively, the mechanical stresses can be determined in simulations and be stored in a control device, for example in the form of a lookup table. A corresponding control of the respective electric machine(s) can be associated with the respective mechanical stress. The table can be created, for example, vehicle-specific in the factory as part of a calibration, but may also be loaded into the corresponding control devices as an exemplarily table determined for all types of a production series.

At least a portion of the mechanical stress may be related to a vibration of the articulated shaft. The vibrations of the articulated shaft can be effectively reduced by considering, in particular minimizing this portion. At least a portion of the mechanical stress may be related to the moment of inertia of the respective electric machine. By considering this portion, a greater dynamics of the wheel and thus of the ABS control can be achieved. At least a portion of the mechanical stress can affect the torque of the friction brake controlled by the anti-lock braking system. By compensating this portion, greater dynamics during braking and thus a shorter braking distance can also be achieved.

Finally, at least a portion of the mechanical stress may be related to the contact force between at least one wheel and the road surface. The mechanical stress of the articulated shaft due to the contact force between the wheel and the road is very high, especially with strongly fluctuating friction coefficients, in particular discontinuities in the friction coefficients. Mechanical stress due to the moment of inertia of the electric machine is very high especially for low friction coefficients, for example on the icy surfaces, and strongly fluctuating friction coefficients. The moment of inertia itself is here generally not dependent on the operating condition (the moment of inertia is a constant, such as the mass)—only the stress caused by the moment of inertia depends on the operating condition. Although moments of inertia cannot actually be changed by the present invention, their influence on the system behavior can be minimized, in particular even compensated, with suitable control technology, so that the controlled system behaves like a system with lower moments of inertia.

Accordingly, the electric machine associated with the at least one drive wheel may advantageously be controlled in the same direction as the friction brake associated with the same drive wheel, wherein "in the same direction" is in relation to the direction of the torque. In general, the electric machine associated with the at least one drive wheel is controlled so as to reduce a determined torsional moment of an articulated shaft connecting the electric machine and the associated drive wheel. This may require control of the electric machine in the same direction and in the opposite direction. Furthermore, the electric machine associated with the at least one drive wheel may be controlled so as to reduce a detected torsional oscillation of an articulated shaft connecting the electric machine and the associated drive wheel. This may also require control of the electric machine in the same direction and in the opposite direction to reduce, in particular compensate the determined torsional vibrations.

Further advantageous embodiments will become apparent from the dependent claims.

The preferred embodiments proposed with reference to the method of the invention and the advantages thereof apply accordingly, when applicable, to the motor vehicle according to the invention.

BRIEF DESCRIPTION OF THE DRAWING

Exemplary embodiments of the present invention will now be described in more detail with reference to the accompanying drawings, wherein.

DETAILED DESCRIPTION OF PREFERRED EMBODIMENTS

Figure 1:
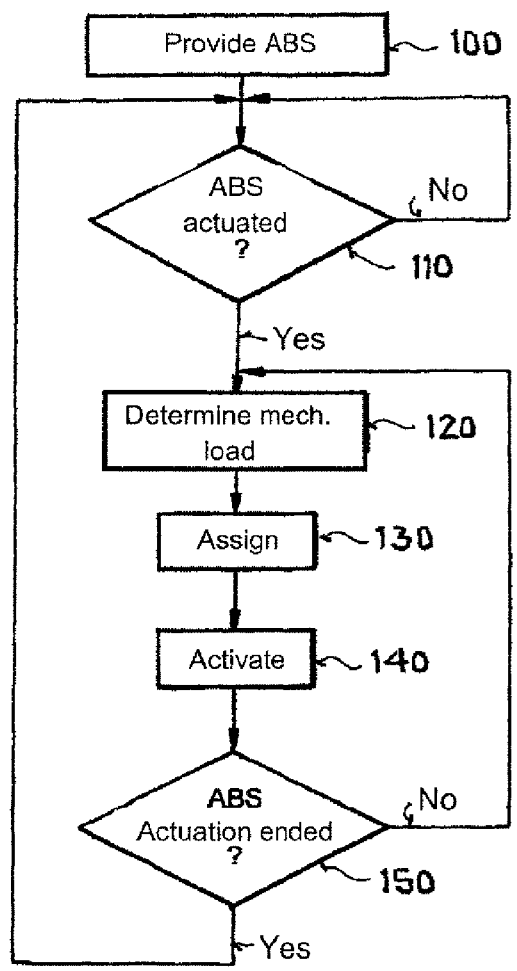
FIG. 1 shows in a schematic diagram of a flow diagram of an exemplary embodiment of a method according to the invention.

FIG. 1 shows a schematic diagram of a flow diagram of an exemplary embodiment of a method according to the invention. First, at step 100, an anti-lock braking system acting separately on the friction brakes of each individual wheel of the motor vehicle is provided. Subsequently, at step 110, it is checked whether the anti-lock braking system has been actuated. If this is the case, then step 120 is executed, wherein mechanical stress of at least one articulated shaft connecting the electric machine and an associated drive wheel is determined. Thereafter, at step 130, at least one cause for the determined mechanical stress is assigned to the at least one drive wheel. In step 140, the electric machine associated with the drive wheel is controlled so as to counteract the cause for the mechanical stress associated with the drive wheel is counteracted, wherein the stress is especially minimized or even compensated. It is then checked at step 150 whether the ABS actuation has been terminated; if this is not the case, the method branches back to step 120. If the ABS actuation was terminated, the method branches back to step 110

Figure 2:
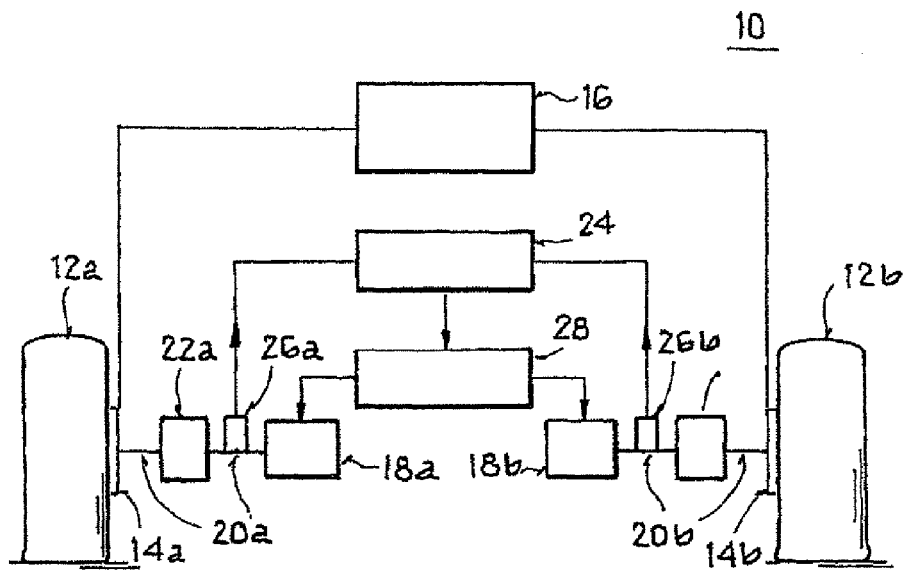
FIG. 2 shows in a schematic diagram a first exemplary embodiment of a motor vehicle according to the present invention.
Figure 3:
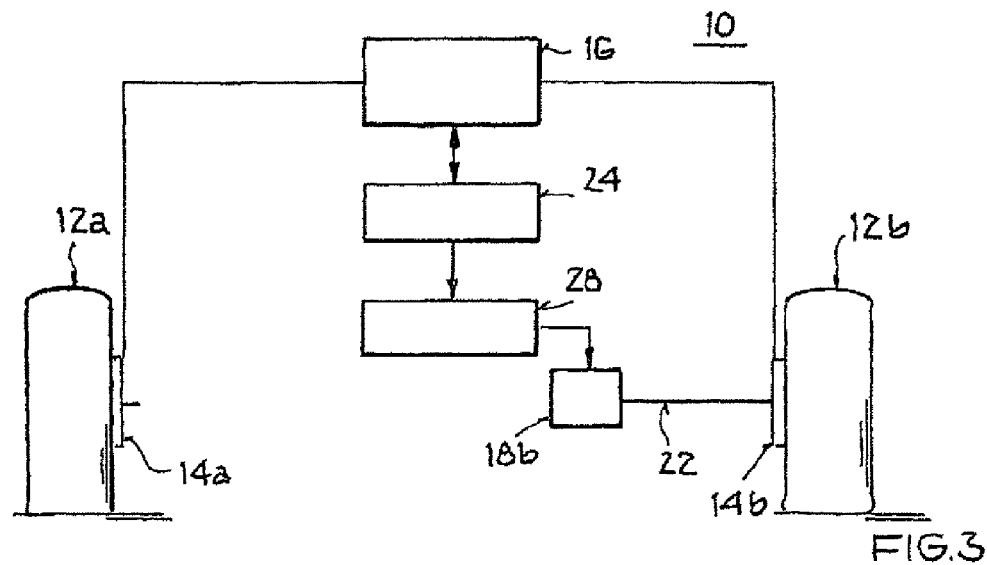
FIG. 3 shows in a schematic diagram a second exemplary embodiment of a motor vehicle according to the present invention.

In FIGS. 2 and 3, the same reference numerals are used for identical and equivalent elements. These are introduced only once for sake of clarity.

FIG. 2 shows the elements that are essential for the present invention of the first embodiment of a motor vehicle 10 according to the invention. This motor vehicle 10 includes in the present example a first drive wheel 12a, with which a first friction brake 14a is associated, and a second drive wheel 12b, with which a second friction brake 14b is associated. An anti-lock braking system designated with 16 is coupled with the two friction brakes 14a, 14b and is configured to operate on the friction brakes 14a, 14b of the drive wheels 12a, 12b individually for each wheel.

A first electric machine 18a coupled via an articulated shaft 20a to the drive wheel 12a is assigned to the first drive wheel 12a. A second electric machine 18b is coupled via an articulated shaft 20b with the drive wheel 12b. The articulated shafts 20a, 20b may be constructed in one piece, but may also be constructed in two parts, wherein a gear 22a, a clutch or the like may be arranged between the two parts.

Drive train in the context of the present invention is therefore the area between the electric machine 18 and the associated drive wheel 12

In the illustrated exemplary embodiment, a determination device 24 is provided which is coupled with sensors 26a, 26b. The determination device 24 is configured to determine a mechanical stress of the drive shafts 20a, 20b during actuation of the anti-lock braking system 16. The sensors 26a, 26b may be configured to detect torsions of the articulated shafts 20a, 20b and/or vibrations of the articulated shafts 20a, 20b.

The sensors 26a, 26b may include, in particular, strain gauges and/or rotation speed sensors and/or angular acceleration sensors and/or rotation angle sensors. An assignment of the stress to the respective wheel 12a, 12b is hereby trivial. The signal from the sensor 26a is associated with the wheel 12a and the signal from the sensor 26b is associated with the wheel 12b, The determination device 24 is configured to calculate from the values measured by the sensors 26a, 26b those quantities required for control by a control device 28 coupled with the determination device 24. For example, the sensors 26a, 26b measure the rotation speed. The determination device 24 can then be designed to calculate from the rotation speed the shaft torque, or the twist angle of the associated articulated shaft. The required quantities may be calculated directly or estimated based on modeling.

The control device 28 coupled with the determination device 24 is configured to assign at least one cause of the detected mechanical stress to the respective drive wheel 12a, 12b. In other words, the determination device 24 detects whether the mechanical stress of the articulated shafts 20a, 20b is caused by the moment of inertia of the respective electric machine 18 and/or by the torque of the friction brake controlled by the anti-lock braking system 16 and/or by the mechanical stress due to the contact force between the respective wheel 12 and the road, and/or by an oscillation of the respective articulated shaft.

The control device 28 is further configured to control the electric machine 18 associated with the respective drive wheel 12 so as to counteract the cause of the mechanical stress associated with the drive wheel 12. To this end, the control device 28 determines from the input variables the required manipulated variables of the electrical machines 18a, 18b. The control device 28 operates separately on each individual wheel, i.e. the control device 28 controls each electric machine 18a, 18b so as to reduce the mechanical stress on the drive train associated with this electric machine 18a, 18b.

In principle, the control of one wheel may also take into account data from the other wheel in order to optimize, for example, the behavior of the entire vehicle.

The control may include varies strategies that can also be combined. A pure control, but also a closed-loop control may be contemplated.

In a first exemplary embodiment, the electric machines are controlled the same direction as the friction brakes. The effects of the moments of inertia can then be compensated and the shaft torque can be reduced. This is possible with a pure control, in particular, even without the use of sensors.

In another exemplary embodiment, the electric machines are controlled so as to compensate the oscillation motion of the respective articulated shaft. This normally requires an actual closed-loop control. Sensors are then typically required.

In the exemplary embodiment illustrated in FIG. 3, only the drive wheel 12b is driven by an electric machine 18b. A sensor is not provided on the articulated shaft 22. Instead, the determination device 24 is coupled to the anti-lock braking system 16, wherein the determination device 24 accesses data provided by the sensors of the anti-lock braking system 16. The data provided by the anti-lock system may include in particular the individual brake pressures for each wheel and/or braking torques of the friction brakes and the individual rotation speeds of the wheels. The embodiment shown in FIG. 3 is particularly advantageous when the electric machine 18b should be controlled in the same direction as the anti-lock braking system 16.

Alternatively, the determination device 24 may make use of the results from the sensors of the anti-lock braking system 16, for which purpose it is connected to the anti-lock braking system 16.

The determination device 24 may also make use of the sensors of the anti-lock braking system 16, i.e. be directly connected to the respective sensors, without being connected to the anti-lock braking system 16 itself.

In another embodiment, additional sensors such as the sensors 26a, 26b of FIG. 2 may be provided, wherein the determination device 24 is not connected to the anti-lock braking system 16. However, the additional sensors 26 may also be provided and the determination device 24 may be additionally coupled with the anti-lock braking system 16.

The additional sensors may also be part of the respective electric machine 18, for example, a rotation speed sensor of the respective electric machine 18.

The invention claimed is:

1. A method for reducing a mechanical stress of at least one component of a drive train of a motor vehicle comprising at least two wheels, of which at least one wheel is a drive wheel, wherein the motor vehicle comprises an anti-Lock braking system and at least one electric machine which is coupled to the at least one drive wheel for driving exactly one drive wheel of the motor vehicle, and a dedicated friction brake for each wheel of the motor vehicle, the method comprising:
   a) providing the anti-lock braking system which operates individually on each friction brake; and
   b) during an activation of the anti-lock braking system:
      b1) determining a mechanical stress of at least one articulated shaft connecting the at least one electric machine and the coupled drive wheel, and
      b2) based on the determined mechanical stress of the at least one articulated shaft, controlling the at least one electric machine coupled to the drive wheel by the at least one articulated shaft so as to counteract the mechanical stress of the at least one articulated shaft.

2. The method of claim 1, wherein the motor vehicle comprises at least a first drive wheel and a second drive wheel and at least a first electric machine coupled to the first drive wheel and a second electric machine coupled to the second drive wheel, the method further comprising:
   determining at step b1) a first mechanical stress of at least one articulated shaft associated with the first electric machine and the first drive wheel,
   determining at step b1) a second mechanical stress of at least one articulated shaft associated with the second electric machine and the second drive wheel,
   controlling at step b2) the first electric machine coupled to the first drive wheel so as to counteract the first mechanical stress, and
   controlling at step b2) the second electric machine coupled to the second drive wheel so as to counteract the second mechanical stress.

3. The method of claim 1, further comprising sensing or calculating the mechanical stress at step b1).

4. The method of claim 1, wherein at least a portion of the mechanical stress relates to a vibration of the at least one articulated shaft.

5. The method of claim 1, wherein at least a portion of the mechanical stress relates to a moment of inertia of the at least one electric machine.

6. The method of claim 1, wherein at least a portion of the mechanical stress relates to a torque of the dedicated friction brake controlled by the anti-lock braking system.

7. The method of claim 1, wherein at least a portion of the mechanical stress relates to a contact force between at least one wheel and a road surface.

8. The method of claim 1, wherein the at least one electric machine coupled to the at least one drive wheel is controlled in an identical direction as the dedicated friction brake associated with the at least one drive wheel, whereby the identical direction refers to a direction of the torque.

9. The method of claim 1, wherein the at least one drive wheel is controlled by the electrical machine so as to reduce a torsional moment of the at least one articulated shaft connecting the at least one electric machine and the coupled drive wheel.

10. The method of claim 1, wherein the at least one electric machine coupled to the drive wheel is controlled so as to reduce detected torsional oscillations of the at least one articulated shaft connecting the at least one electric machine and the coupled drive wheel.

11. A motor vehicle, comprising:
   at least two wheels, of which at least one wheel is a drive wheel,
   a first friction brake associated with a first of the at least two wheels;
   a second friction brake associated with a second of the at least two wheels;
   an anti-lock braking system configured to act individually on the friction brakes of each wheel of the motor vehicle;
   at least one electric machine, each electric machine coupled to exactly one drive wheel of the motor vehicle for driving the coupled drive wheel;
   at least one determination device configured to determine, during actuation of the anti-lock braking system, a mechanical stress of at least one articulated shaft connecting the at least one electric machine and the coupled drive wheel; and
   a control device coupled with the determination device, wherein the control device is configured to control, based on the determination of the mechanical stress of the at least one articulated shaft by the at least one determination device, the at least one electric machine coupled to the drive wheel so as to counteract the mechanical stress of the at least one articulated shaft.

* * * * *